Figure 1:
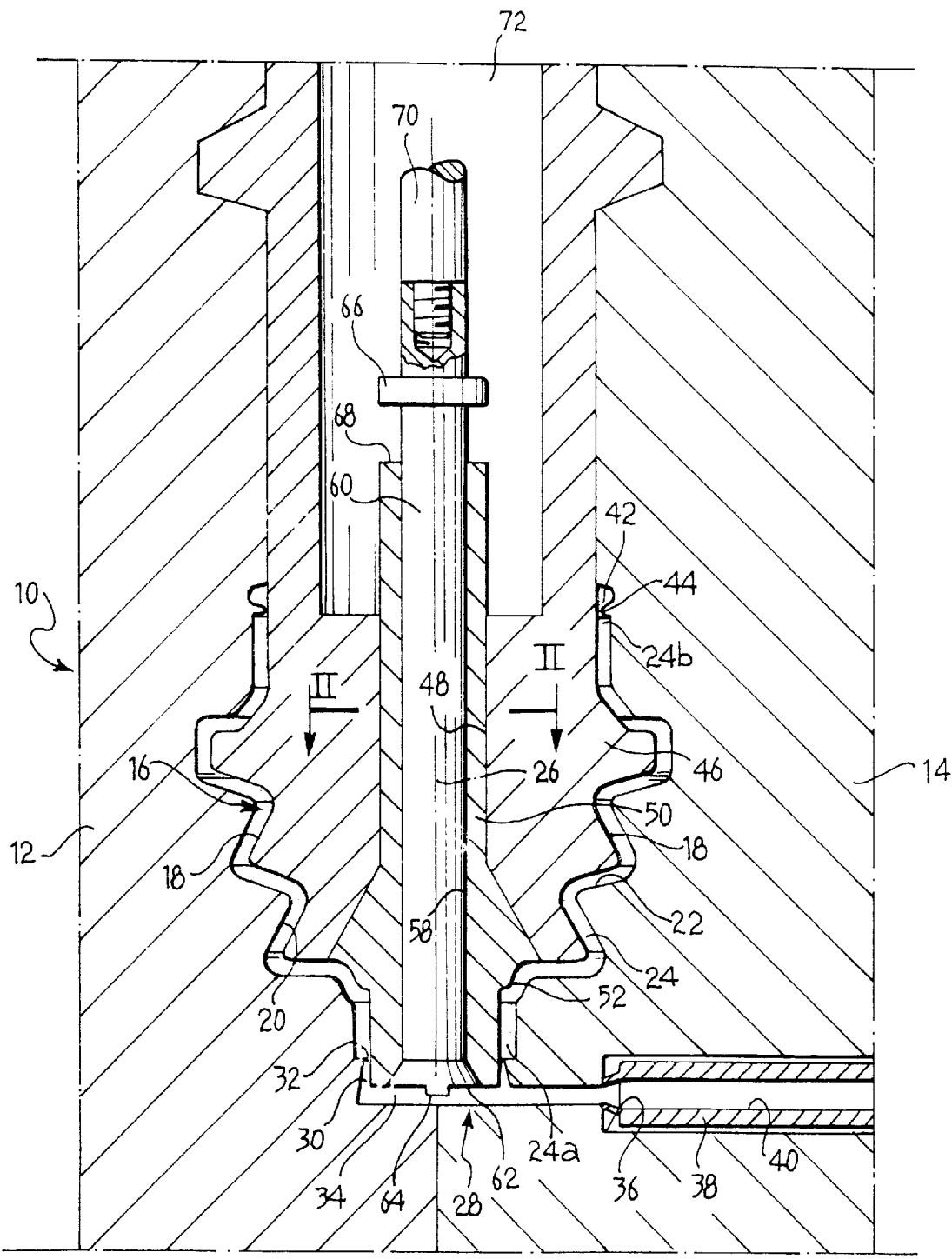

United States Patent [19]

Debenedetti

[11] Patent Number: 5,928,683
[45] Date of Patent: Jul. 27, 1999

[54] APPARATUS FOR THE PRODUCTION OF AN ARTICLE OF ELASTOMERIC MATERIAL

[75] Inventor: Guglielmo Debenedetti, Turin, Italy

[73] Assignee: Insit Industria S.p.A., Turin, Italy

[21] Appl. No.: 08/884,754

[22] Filed: Jun. 30, 1997

[30] Foreign Application Priority Data

Jul. 2, 1996 [EP] European Pat. Off. .............. 96830374

[51] Int. Cl.$^6$ ............................ B29C 45/38; B29C 45/40
[52] U.S. Cl. ...................... 425/577; 425/556; 425/436 R; 425/437; 425/DIG. 51
[58] Field of Search .................................... 425/577, 556, 425/444, 436 R, 553, 554, 438, 440, 441, 436 RM, DIG. 51, 437; 264/328.11, 334, 328.1

[56] References Cited

U.S. PATENT DOCUMENTS

| | | | |
|---|---|---|---|
| 2,471,148 | 5/1949 | Gale et al. ................................ | 425/444 |
| 4,552,328 | 11/1985 | Dutt et al. ................................ | 425/577 |
| 5,368,468 | 11/1994 | Boskovic ................................. | 425/437 |
| 5,490,966 | 2/1996 | Peterson et al. ......................... | 425/577 |

FOREIGN PATENT DOCUMENTS

| | | |
|---|---|---|
| 29-20432 | 11/1980 | Germany . |
| 38-23017 | 1/1990 | Germany . |
| 46-6187 | 2/1971 | Japan ...................................... 425/437 |
| 61-262112 | 11/1986 | Japan ...................................... 425/438 |
| 1-214418 | 8/1989 | Japan . |
| 2-39907 | 2/1990 | Japan ................................. 425/436 R |
| 5-245889 | 9/1993 | Japan . |
| 6-55586 | 3/1994 | Japan ...................................... 425/556 |
| 6-190878 | 10/1994 | Japan . |
| WO 94/12332 | 6/1994 | WIPO . |

Primary Examiner—Jay H. Woo
Assistant Examiner—Robert Hopkins
Attorney, Agent, or Firm—Thorpe, North & Western, L.L.P.

[57] ABSTRACT

The apparatus is for molding an article of elastomeric material which has circular symmetry and is open at both ends, particularly for the production of protective bellows for vehicles. The apparatus comprises a die comprising an outer portion and an inner portion between which a molding cavity and an injection region are defined. The article of elastomeric material which is formed in the molding cavity remains anchored to the die portion after the outer die portion has been opened. Before the article is removed automatically from the inner die portion, a waste cap formed by the material which solidifies in the injection region is removed by means of a member.

7 Claims, 4 Drawing Sheets

APPARATUS FOR THE PRODUCTION OF AN ARTICLE OF ELASTOMERIC MATERIAL

DESCRIPTION

The present invention relates to an apparatus for the production of an article of elastomeric material.

The invention has been developed specifically for the production of synthetic rubber articles having circular symmetry with respect to a longitudinal axis and being open at both ends. A typical field of application of the present invention is that of the production of protective bellows for vehicles, used for protecting homokinetic joints or transmissions on the differential side. However, the invention may equally well be used to produce any product of elastomeric material with circular symmetry and with two open ends such as, for example, smooth or bellows-shaped tubes or sleeves.

A production method already used by the Applicant provides for elastomeric material to be injected into a moulding cavity defined between an outer die portion and an inner die portion. The injection is carried out through an injection region formed in the outer moulding portion and communicating with an end of the moulding cavity through a restricted portion. The elastomeric material which fills the moulding cavity is heated to the vulcanization temperature by contact with the heated walls of the die. After the outer die portion has been opened, the solidified article remains adhering to the inner die portion. The article is removed automatically by means of a slidable extractor member carried by the inner portion of the die.

The article produced by this moulding method has a waste cap integrally connected to one end of the article. This cap is formed by the elastomeric material which fills the injection region and is vulcanized simultaneously with the material housed in the moulding cavity. With the known method it is necessary to remove the waste cap manually by means of a cutting operation.

The object of the present invention is to provide an improved moulding method and apparatus which do not require manual operations to finish the products.

According to the present invention, this object is achieved by a moulding method and apparatus having the characteristics forming the subject of the claims.

The innovative concept on which the present invention is based consists essentially in the fact that, whilst the article is still held on the inner portion of the die, the waste cap is removed automatically, preferably by the movement of the waste cap away from the inner portion of the die in a longitudinal direction until the narrow portion which connects the flashing to the end of the article is torn. The finished article is then extracted automatically and does not need any manual finishing operation.

Figure 2:
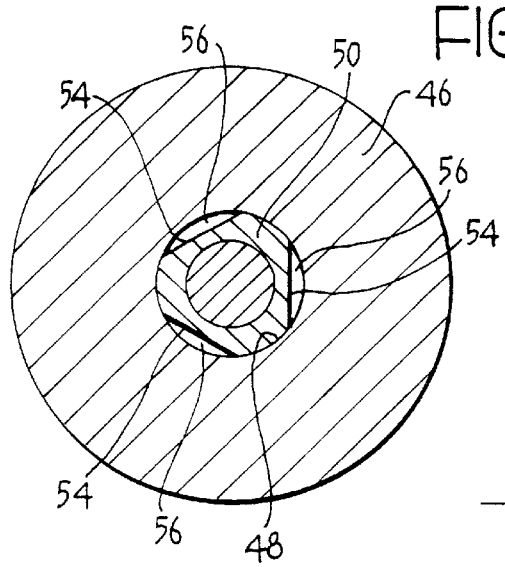
Figure 3:
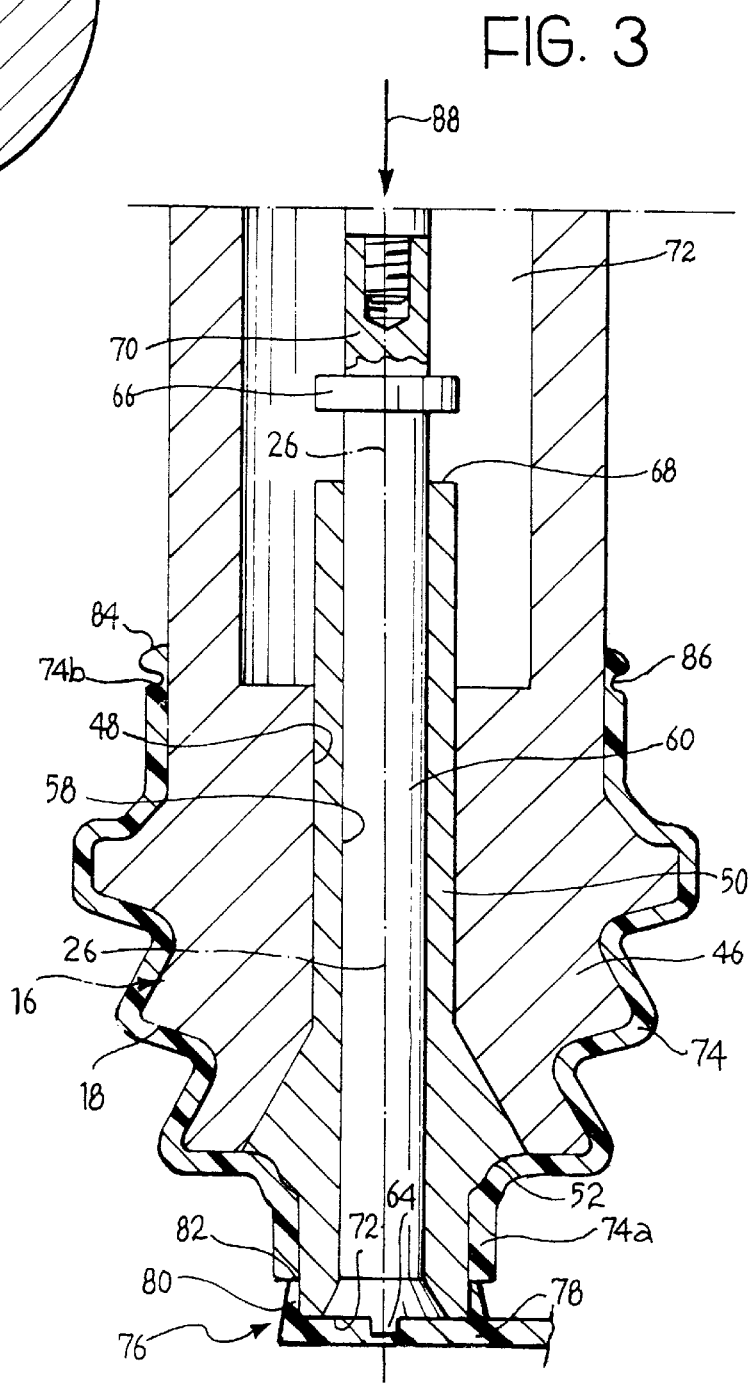

Further characteristics and advantages of the present invention will become clear in the course of the following detailed description, given purely by way of non-limiting example, with reference to the appended drawings, in which:

FIG. 1 is a schematic, axial section illustrating moulding apparatus according to the present invention at the beginning of the moulding cycle, FIG. 2 is a section taken on the line II—II of FIG. 1, and FIGS. 3–5 are schematic, axial sections showing various operative sequences of the method according to the invention.

In FIG. 1, a die for producing a bellow of elastomeric material is indicated 10. The die 10 comprises an outer portion including two half-shells 12 and 14 movable between the closed position shown in FIG. 1 and an open position which allows the bellow to be removed from the die.

A fixed die portion 16 disposed between the two half-shells 12, 14 has an outer surface 18 with a shape corresponding to that of the internal surface of the article to be produced. The shells 12, 14 have respective moulding surfaces 20, 22 which, together with the surface 18 of the inner die portion 16, define a moulding cavity 24 with a shape corresponding to that of the article to be produced. The moulding cavity 24 has circular symmetry with respect to a longitudinal axis 26 and has a first end 24a and a second end 24b.

The first end 24a of the moulding cavity 24 communicates with an injection region 28 situated at one end of the inner die portion 16. The injection region 28 comprises an annular cavity 30 which communicates with the first end 24a of the moulding cavity 24 through a portion 32 with a restricted cross-section. The annular cavity 30 communicates with a disc-shaped cavity 34 which in turn communicates with an injection hole 36 in which there is a thermally-regulated nozzle 38. An injection duct 40 in the nozzle 38 supplies the elastomeric material to the injection region 28. In the injection duct 40, the material is kept at a temperature below the vulcanization temperature of the material, for example, a temperature of the order of 60–120° C. The die 10, on the other hand, is kept at a temperature equal to or greater than the vulcanization temperature of the material, for example, a temperature of the order of 170–210° C.

The second end 24b of the moulding cavity 24 communicates with a circular groove 42 through a portion 44 with a restricted cross-section. The groove 42 has the purpose of collecting air bubbles and impurities such as, for example, lumps or the like, during the injection of the material into the moulding cavity 24. Around its periphery, the restricted portion 44 has points of reduced cross-section the purpose of which is to form preferential breakage points for the removal of the flash which collects in the channel 42.

The inner die portion 16 comprises a base body 46 with a longitudinal hole 48 in which an extractor member 50 is mounted for sliding. The extractor member 50 has a surface 52 which forms the internal surface of the moulding cavity 24 in the vicinity of the end 24a. In a projection in a plane perpendicular to the longitudinal axis 26, the surface 52 of the extractor member 50 has an area other than zero so as to be able to exert a mechanical removal action on the article formed in the moulding cavity 24.

As can be seen in FIG. 2, the outer surface of the extractor member 50 has a series of flats 54 which, with the wall of the hole 48, form longitudinal ducts 56 for the passage of a compressed-air flow.

With reference once again to FIG. 1, the extractor member 50 has a longitudinal hole 58 in which a member 60 for removing the waste cap formed in the injection region 28 can slide. The member 60 for removing the cap has a thrust surface 62 substantially perpendicular to the longitudinal axis 26 and having a projection 64. The member 60 also has a shoulder 66 for abutting a frontal surface 68 of the extractor member 50. The member 66 is connected to a rod 70 of a linear actuator of known type, for example, a pneumatic actuator for moving the member 60 in order to remove the cap and to move the extractor member 50 in the manner which will be described below.

The base body 46 of the inner die portion 16 has a cavity 72 which is connected to a compressed-air reservoir (not shown) with a rapid-discharge valve which can produce a large-volume jet of air at a pressure which can be set. This jet of air is used during the automatic extraction of the article of elastomeric material, as will be described below.

Starting from the configuration of FIG. 1, the elastomeric material is injected into the moulding cavity 24 through the injection region 28 and the portion 32 of restricted cross-section. According to the present invention, the restricted portion 32 preferably has a small orifice with a width of ≦0.1 mm. This allows the elastomeric material to be superheated during its passage through the restricted portion, reducing the vulcanization times. Moreover, the portion 32 of restricted cross-section has a filtering effect on the mixture, eliminating any lumps or granules with dimensions larger than the orifice.

The material fills the moulding cavity 24 uniformly and any moulding defects (air bubbles, lumps, etc) are urged in the direction of advance of the injected jet and collect in the annular groove 42 disposed at the end 24b of the moulding cavity 24. Upon completion of the injection stage, the die is kept closed for the time necessary to vulcanize the material. The outer portion of the die is then opened by the movement apart of the two shells 12, 14 and the moulding apparatus is then in the configuration shown in FIG. 3.

An article 74 of elastomeric material with a shape corresponding to that of the moulding cavity 24 remains anchored to the outer surface 18 of the inner die portion 16. A first end 74a of the article 74 is closed by a waste cap 76 constituted by the material which is vulcanized in the injection region 28. The waste cap 76 has a disc-shaped portion 78 from which an annular wall 80 projects and is connected to the end 74a of the article 74 by means of a narrow portion 82. An annular waste rib 84 formed at the second end 74b of the article 74 is connected to the end 74b by means of a narrow portion 86 with preferential breakage points around its periphery.

The injection of the material from one end of the article enables any moulding defects to be localized in the waste rib 84 without the need to form so-called lateral flash which would have to be removed by subsequent finishing operations. It is also of particular importance from the point of view of the quality of the article that the injection of the material is isotropic around the circumference.

Figure 4:
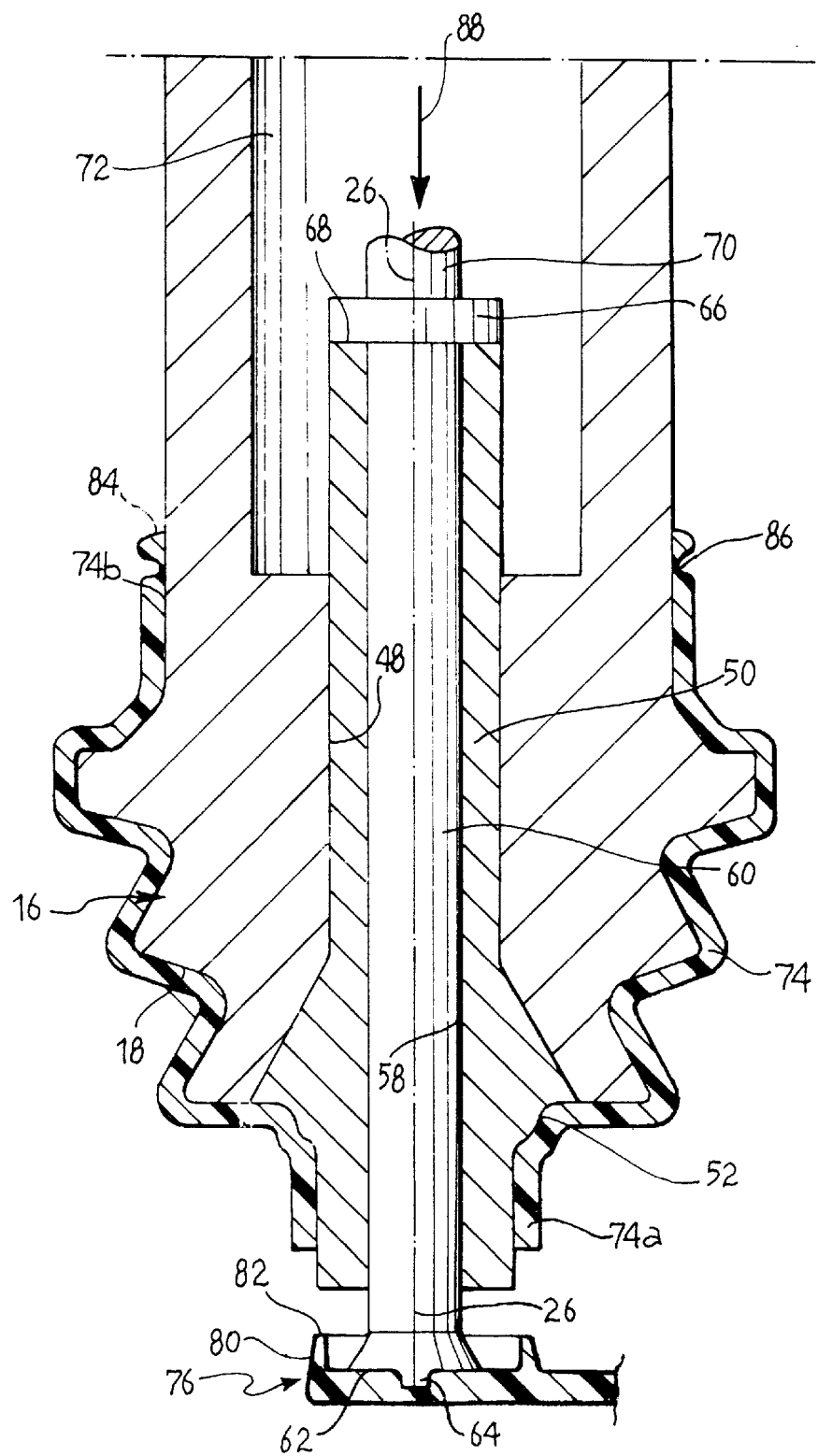

After the outer mould portion has been opened, the rod 70 of the linear actuator is driven in the direction indicated by the arrow 88. During the first stage of the travel of the rod 70, the extractor member 50 remains stationary, whilst the member 60 which removes the waste cap 76 slides axially. As shown in FIG. 4, the axial movement of the member 60 moves the waste cap 76 away from the fixed mould portion 16, consequently tearing the narrow portion 82. The projection 64 on the flat surface 62 of the member 60 ensures that the waste cap 76 remains centred relative to the member 60 and thus prevents the narrow section 82 from tearing only partially.

As the rod 70 continues its travel in the direction 88, the shoulder 66 abuts the frontal surface 68 of the extractor member 50 and thus moves the extractor member 50 in the direction 88. At the same time, the rapid-discharge valve is operated and sends a jet of compressed air with a high flow rate into the cavity 72.

Figure 5:
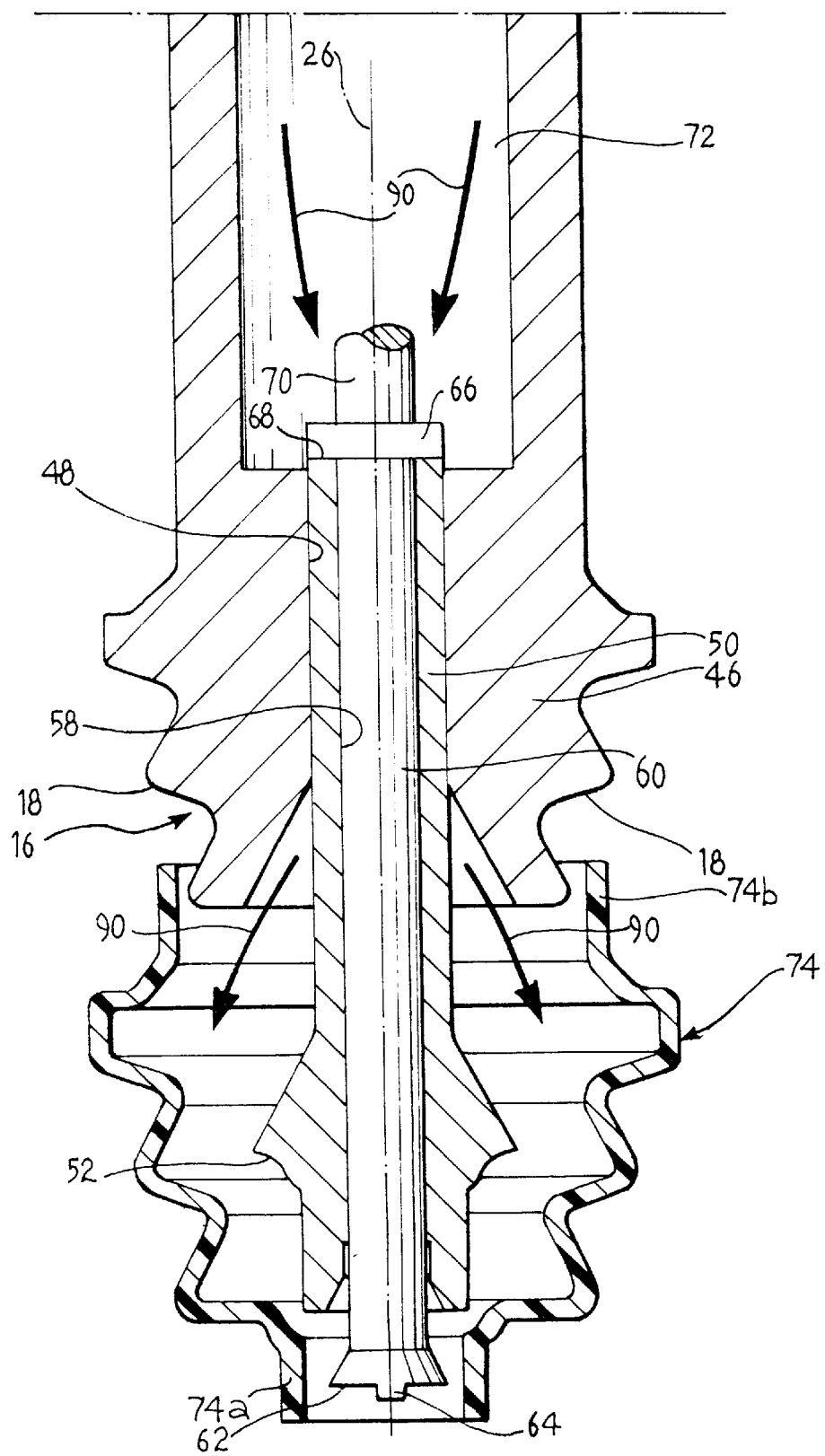

With reference to FIG. 5, during the movement in the direction 88, the extractor member 50 exerts a mechanical removal action on the article 74 by means of the surface 52. The mechanical action brought about by the extractor member 50 is assisted by the jet of compressed air, shown schematically by the arrows 90, which passes through the longitudinal ducts 56 (FIG. 2) and emerges in the space created between the outer surface 18 of the die portion 16 and the inner surface of the article 74. The combined effect of the mechanical and pneumatic forces removes the article 74 from the inner die portion 16. During the removal, the second end 74b of the article 74 is opened out radially and causes the narrow portion 86 to tear, consequently detaching the waste rib 84.

As can be seen in FIG. 5, upon completion of the automatic extraction stage, an article 74 is obtained in its final form without the need for any further finishing operation.

What is claimed is:

1. Apparatus for moulding a protective bellow of elastomeric material which has circular symmetry and is open at both ends, particularly for producing protective bellows for vehicles, comprising:

an outer die portion and an inner die portion defining between them a moulding cavity for said bellow and an injection region including a cavity defining a waste cap for said bellow, wherein said waste cap cavity at one end thereof communicates with a first end of the moulding cavity through a passage having a restricted flow cross-section for the injected material and at the other end thereof with an injection hole, means for the automatic extraction of the bellow held on the inner die portion, comprising an extractor member movable within said inner die portion in a direction parallel to the longitudinal axis of the bellow, means for the automatic removal of the waste cap formed integrally with the bellow while the bellow is held on the inner die portion and on said extractor member, comprising a waste cap removing member slidable axially within said extractor member, said waste cap removing member having a frontal thrust surface and being movable between a retracted position wherein the frontal thrust surface defines the inner wall surface of the waste cap cavity and an extracted position, and actuator means adapted to move said waste cap removing member from the retracted to the extracted position thereby to remove the waste cap by tearing off the elastomer material in said restricted flow section.

2. Apparatus according to claim 1, comprising a single linear actuator which causes the member for removing the waste cap to travel relative to the extractor member, and causes the extractor member to travel relative to a stationary base body.

3. Apparatus according to claim 1, wherein the member for removing the waste cap has a frontal thrust surface with a locating projection.

4. Apparatus according to claim 1, wherein a second end of the moulding cavity communicates, through a restricted portion, with an annular groove for localizing moulding defects.

5. Apparatus according to claim 1, wherein the restricted portion which connects the injection region to the moulding cavity has an orifice with a radial width of ≦0.1 mm.

6. Apparatus according to claim 1, wherein the extractor member has an outer surface formed so as to define at least one longitudinal duct between the extractor member and the inner die portion for supplying a flow of compressed air at a frontal region of the inner die portion.

7. Apparatus according to claim 6, wherein said outer surface of the extractor member is formed with at least one flat.

* * * * *